H. R. EDGECOMB.
TESTING DEVICE.
APPLICATION FILED JAN. 7, 1914.

1,231,580.

Patented July 3, 1917.

WITNESSES:
Fred A. Lind
R. J. Ridge

INVENTOR
Henry R. Edgecomb
BY
Wiley G. Carr
ATTORNEY

UNITED STATES PATENT OFFICE.

HENRY R. EDGECOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

TESTING DEVICE.

1,231,580. Specification of Letters Patent. Patented July 3, 1917.

Application filed January 7, 1914. Serial No. 810,770.

*To all whom it may concern:*

Be it known that I, HENRY R. EDGECOMB, a citizen of the United States, and a resident of Wilkinsburg, in the county of Allegheny and State of Pennsylvania, have invented a new and useful Improvement in Testing Devices, of which the following is a specification.

My invention relates to testing devices, and it has for its object to provide a device for testing the relative stickiness of adhesive materials.

The tapes used in insulating electrical conductors possess various degrees of adhesiveness. Some of the tapes are affected by temperature changes and some by moisture absorption. To determine the relative stickiness of adhesive materials, as affected by these conditions, I provide a device for accurately recording the same, as hereinafter described.

Figure 3:
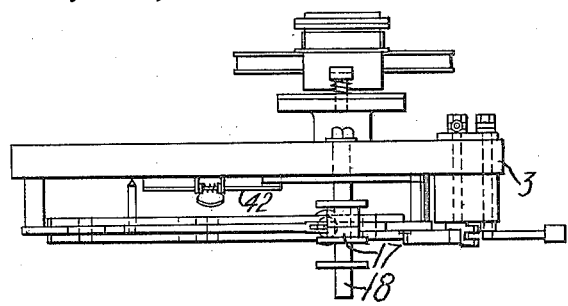
Figure 2:
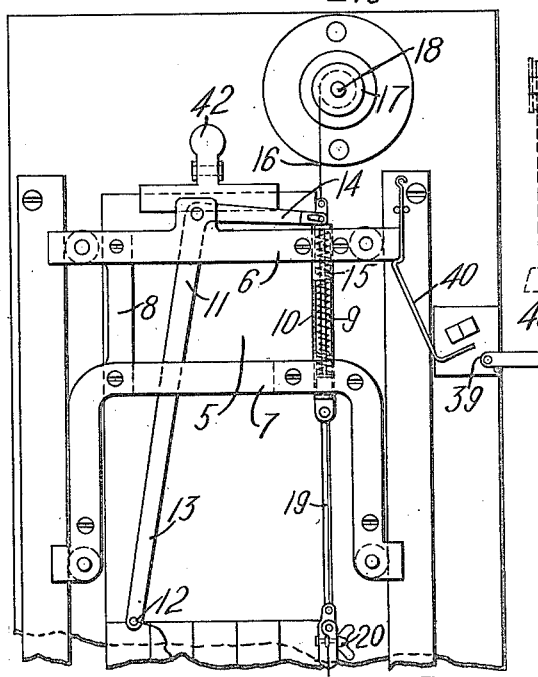
Figure 2:
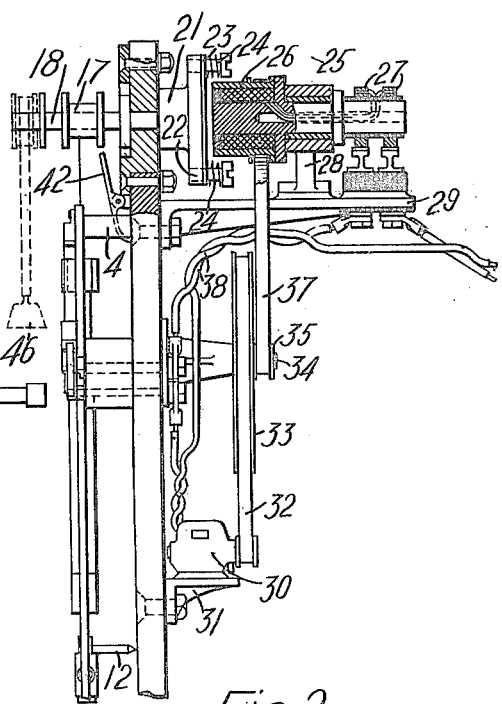
Figure 1:
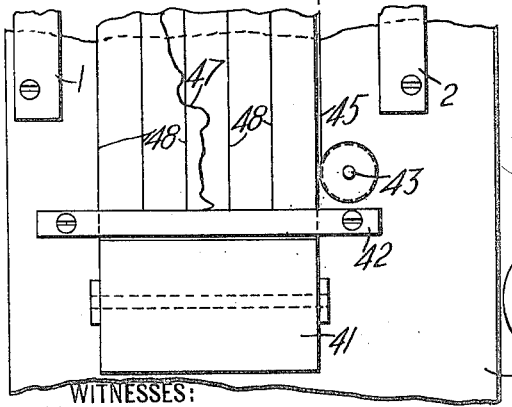
Figure 1:
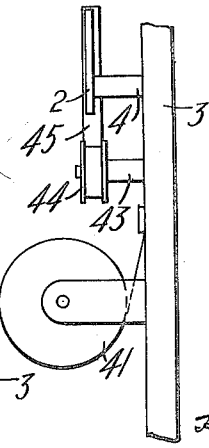

In the accompanying drawings, Figure 1 is a front view, partially in elevation and partially in section, of a device embodying my invention, Fig. 2 is a side view, partially in elevation and partially in section, of the device shown in Fig. 1, and Fig. 3 is a top plan view of the device shown in Figs. 1 and 2.

Two guide rails 1 and 2 are supported upon a base 3 by a plurality of posts 4. A carriage 5 comprising a bar 6 which has guide grooves at each end to conform to the rails 1 and 2, a U-shaped member 7 that also has grooves therein to fit the rails 1 and 2, a spacing member 8 which is interposed between the members 6 and 7, a sportsman's or spring balance 9 the barrel 10 of which is also used as a spacing member and that is rigidly attached to the members 6 and 7, and a bell crank lever 11 that is pivotally mounted upon the member 6 forms a part of my invention. The lever 11 carries a marking pencil 12 near the end of its longer arm 13, and the other arm 14 is provided with a slot near its end for loosely attaching it to the spring member 15 of the balance 9. One end of a cord 16 is also connected to the spring member 15 and the other end of the same is attached to a spool or pulley 17 on a shaft 18. A rod 19, to which is attached a clamping member 20, is suspended from the lower side of the carriage 5.

The shaft 18, which carries the pulley 17, has mounted at one end thereof a clutch member 21 comprising a circular member 22 and a plate member 23 which is acted upon by a plurality of springs 24 to normally retain the same in engagement with the member 22. The driving member 25 of the clutch comprises a rotatable electromagnet 26, two slip rings 27 and a bearing member 28, all of which are supported on a bracket 29 which extends from the rear side of the base member 3. A motor 30 is also supported on a bracket 31 which extends from the rear side of the base 3 and drives, through a belt 32, a pulley wheel 33 on an auxiliary shaft 34 upon which is also mounted a second pulley wheel 35 which drives the rotatable electromagnet 26 through a belt 37.

The motor 30 and the electromagnet 26 are electrically connected in series by conductors 38, and the circuit through the same is controlled by a knife blade switch 39 the movable member of which is engaged by a spring member 40 when actuated by a projection on the bar 6 of the carriage 5, the spring being of such form that it retains the carriage in its upper position after the motor has stopped and the clutch has opened, substantially as shown in the drawing.

A roll of paper 41 and a plurality of holders 42 for the same are attached to the base 3, substantially as shown. An idler shaft 43 is provided which is parallel with and vertically below the shaft 18, and a removable bobbin 44 is provided to fit either the outer end of the shaft 18 or the shaft 43.

A strip of tape 45 of perhaps a yard in length is fastened, by its upper end, to the bobbin 44 and a weight 46 of preferably one pound is attached to its lower end. The carriage 5 is released from engagement with the spring 40 and allowed to travel downwardly by the force of gravity, The bobbin 44 is then placed upon the shaft 18 and the knife blade switch 39 is closed. The carriage 5 will be raised as the bobbin 44 rotates and the tape 45 will be wound upon the bobbin substantially as is shown in the dotted lines in Fig. 2. As the carriage rises, the bar 6 engages the spring 40, to throw the knife blade member of the switch 39 out of engagement with its stationary member and the spring 40 quickly springs back and retains the carriage in its upper position. The bobbin 44 is then removed from the shaft 18 and placed loosely on the idler shaft 43 and the weight 46 removed. The carriage 5 is again lowered and the free end of the tape is attached to the clamp 20. The knife blade member of the switch 39 is again closed to start the motor, and the clutch drives the shaft 18, thus drawing the carriage 5 upwardly and unwinding the tape. The arm 14 of the bell crank lever 11 will rise when the tape adheres and will fall when the tape does not adhere, thus the pencil 12 will describe a curve 47, on the paper which is a measure of the stickiness of the tape, as will be readily seen.

The paper may be calibrated by attaching bodies of different weights to the clamp 20 and drawing the carriage 5 upwardly, thus describing a substantially straight line 48 for each weight used.

Various samples of the tape to be tested are selected, and curves are drawn, substantially as hereinbefore described, then an average of each curve is taken through its most characteristic section and these averages are averaged for a final coefficient or mark of the stickiness of the tape.

While I have described my invention in its preferred form, I desire it to be understood that changes may be made therein which do not depart from the scope of the same as defined in the appended claims.

I claim as my invention:

1. In a device for testing the adhesiveness of materials, the combination with means for supporting a roll of material to be tested, of means for unwinding the said roll of material, and a resiliently actuated recording means interposed between the said unwinding means and the said material to be tested.

2. In a device for testing the adhesiveness of materials, the combination with an unwinding means for a roll of material to be tested, of a resilient means interposed between the said unwinding means and the material to be tested, and means for recording the variations of tension upon the said resilient means.

3. In a device for testing the adhesiveness of materials, the combination with means for supporting a roll of material to be tested, of an unwinding means for the said roll of material, a resilient means interposed between the said unwinding means and the material to be tested, and means for recording the tension upon the said resilient means.

4. In a device for testing the adhesiveness of materials, the combination with an unwinding means for a roll of material to be tested, of a spring having one end connected to the said unwinding means and the other end connected to the material to be tested, and a bell crank lever connected to the said spring and having a marking device for recording the variations in the tension of the said spring.

5. A method of testing the adhesiveness of a material consisting in winding the said material into a roll against a constant force and then unwinding the said material against a yielding resistance and noting the variations of such resistance.

6. A device for testing the relative adhesiveness of a material comprising an unwinding means for a roll of material to be tested, a spring interposed between the said unwinding means and the said material to be tested, a movable carriage attached to one end of the said spring, a bell crank lever pivotally mounted on the said carriage and operatively connected to the other end of the said spring, and a marking means attached to the said lever.

7. A device for testing the relative adhesiveness of a material comprising an unwinding means for a roll of material to be tested, a spring interposed between the said unwinding means and the said material to be tested, a movable carriage attached to one end of the said spring, a bell crank lever pivotally mounted on the said carriage and operatively connected to the other end of the said spring, means for winding the said material on a bobbin against a constant force, and marking means attached to the said lever.

In testimony whereof, I have hereunto subscribed my name this 30th day of Dec., 1913.

HENRY R. EDGECOMB.

Witnesses:
 GOLDIE E. McGEE,
 B. B. HINES.